US010705797B2

(12) United States Patent
Lokappa et al.

(10) Patent No.: US 10,705,797 B2
(45) Date of Patent: Jul. 7, 2020

(54) PARALLEL-PREFIX ADDER AND METHOD

(71) Applicant: MARVELL INTERNATIONAL LTD., Hamilton (BM)

(72) Inventors: Ranjan B. Lokappa, Winooski, VT (US); Igor Arsovski, Williston, VT (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 28 days.

(21) Appl. No.: 16/200,689

(22) Filed: Nov. 27, 2018

(65) Prior Publication Data
US 2020/0167127 A1 May 28, 2020

(51) Int. Cl.
*G06F 7/506* (2006.01)
(52) U.S. Cl.
CPC .................... *G06F 7/506* (2013.01)
(58) Field of Classification Search
CPC ....................................... G06F 7/506
USPC ........................... 708/711, 670, 707
See application file for complete search history.

(56) References Cited

U.S. PATENT DOCUMENTS

| 5,278,783 | A | * | 1/1994 | Edmondson | ............ | G06F 7/508 708/711 |
| 7,155,473 | B2 | | 12/2006 | Kalampoukas et al. | | |
| 7,188,134 | B2 | | 3/2007 | Mathew et al. | | |
| 7,325,025 | B2 | * | 1/2008 | Fletcher | .................. | G06F 7/508 708/711 |
| 7,349,938 | B2 | * | 3/2008 | Chirca | .................... | G06F 7/506 708/711 |
| 7,509,368 | B2 | | 3/2009 | Anders et al. | | |

OTHER PUBLICATIONS

Esposito et al., "Variable Latency Speculative Han-Carlson Adder," IEEE Transactions on Circuits and Systems—I: Regular Papers, vol. 62, Issue 5, 2015, pp. 1353-1361.
Sharma et al., "Estimation of Area, Power and Delay of Different IOs-Vector Length Kogge Stone Adder," International Journal of Electrical and Electronics Engineers, vol. 9, Issue 1, 2017, pp. 1637-1647.

* cited by examiner

*Primary Examiner* — Tan V Mai

(57) ABSTRACT

Disclosed is a parallel prefix adder structure with a carry bit generation circuit that generates primary carry bits for only some bit pairs and a sum circuit with ripple carry adders that use these primary carry bits to generate secondary carry bits and sum bits for a final sum. The carry bit generation circuit has different sections, which process different sequential sets of bit pairs and which have different sparsity configurations. As a result, generation of the primary carry bits is non-uniform. That is, in the different sections the primary carry bits are generated at different carry bit-to-bit pair ratios (e.g., the carry bit-to-bit pair ratios for the different sections can be 1:2, 1:4, and 1:2, respectively). For optimal performance, the specific bit pairs for which these primary carry bits are generated varies depending upon whether the maximum operand size is an odd number of bits or an even number.

20 Claims, 11 Drawing Sheets

PARALLEL-PREFIX ADDER AND METHOD

BACKGROUND

Field of the Invention

The present invention relates to adders and, more particularly, to a low-area, low-power, parallel prefix adder and method.

Description of Related Art

Adders are fundamental logic blocks, which can be incorporated into an integrated circuit (IC) structure to perform a binary addition operation. For applications that require complex arithmetic operations and, particularly, addition where the word size is relatively large (e.g., 16 bits, 32 bits, 64 bits, etc.) an optimized arithmetic logic block that includes multiple adders may be employed. A ripple carry adder (RCA) is a conventional adder that includes a predetermined number (n) of cascading full adders (FAs) in series configured to add together two n-bit binary words (referred to as addends). In an RCA, the first FA receives, as inputs, the least significant bits (LSBs) (A[0]B[0]) from the two addends and outputs a sum bit (S0) and a carry bit (C0) for that LSB position; the second FA receives, as inputs, the next-to-LSBs (A[1]B[1]) from the two addends and the carry bit (C0) from the first FA and outputs a sum (S1) and a carry bit (C1) for that bit position; and so on until the last FA receives, as inputs, the most significant bits (MSBs) (A[n−1]B[n−1]) from the two addends and a carry bit (Cn−1−1) from the next to last FA and outputs a last sum bit (Sn−1) and final carry bit (Cout) for the MSB position. Unfortunately, since the bits of the addends are added together in sequence from the LSBs to the MSBs, RCAs are associated with significant delay (i.e., poor performance). Alternative adder configurations, such as carry select adders (CSAs), carry look-ahead adders (CLAs), and parallel prefix adders (PPAs) (e.g., Kogge-Stone adders (KSAs)), have been developed to reduce this delay (i.e., to improve performance). However, such adders can be costly in terms of chip surface area required, dynamic power consumed and routing congestion.

SUMMARY

In view of the foregoing, disclosed herein is a parallel prefix adder structure that balances the design goals of reducing delay, reducing area consumption, reducing power consumption, and reducing routing congestion and a method of forming the structure. Specifically, the parallel prefix adder structure incorporates a carry bit generation circuit (also referred to herein as a carry bit generation tree or adder tree), which is configured to generate primary carry bits for at least some bit pairs and a sum circuit, which includes multiple relatively small ripple carry adders (RCAs) that use these primary carry bits to generate secondary carry bits as well as sum bits for computation of a final sum. However, unlike carry bit generation circuits in prior art adders where the primary carry bits are uniformly generated (e.g., at every second bit pair in the case of a sparsity-2 configuration or at every fourth bit pair in the case of a sparsity-4 configuration), the disclosed carry bit generation circuit has different sections, which process different sequential sets of bit pairs and which have different sparsity configurations such that generation of the primary carry bits is non-uniform. That is, in the different sections the primary carry bits are generated at different carry bit-to-bit pair ratios (e.g., the different carry bit-to-bit pair ratios for the different sections can be 1:2, 1:4, and 1:2, respectively). For optimal performance, the specific bit pairs for which these primary carry bits are generated will vary depending upon whether the maximum operand size of the adder is an odd number of bits or an even number. Such a parallel prefix adder can be used to achieve a significant decrease in area and power consumption (e.g., by up to 25% or more) and a significant decrease in dynamic power consumption (e.g., by up to 25% or more) with only a minimal increase in delay (e.g., by less than 5%) as compared to conventional Kogge-Stone Adder (KSA).

More particularly, disclosed herein is a parallel prefix adder structure configured to compute the sum of two addends.

Generally, each embodiment of the disclosed adder can include a signals generation circuit, which is configured to receive the two addends and to generate corresponding propagation and generation signals for all bit pairs of same position bits in the two addends. For example, for addends A and B, each having n-bits from the least significant bit (LSB) [0] to the most significant bit (MSB) [n−1], the signals generation circuit can generate corresponding propagation and generation signals for bit pairs: A[0]B[0]; A[1]B[1]; . . . ; and A[n−1],B[n−1]. Generation of the propagation and generation signals is discussed in greater detail within the detailed description section of the specification below.

Each embodiment of the disclosed adder can further include a primary carry bit generation circuit configured to receive the corresponding propagation and generation signals and to non-uniformly generate primary carry bits. Specifically, the primary carry bit generation circuit can include multiple sections. The multiple sections can include a first section, which uses the corresponding propagation and generation signals for each bit pair in a first sequential set of bit pairs to generate first primary carry bits at a first carry bit-to-bit pair ratio. The multiple sections can include second section, which uses the corresponding propagation and generation signals for each bit pair in a second sequential set of bit pairs to generate second primary carry bits at a second carry bit-to-bit pair ratio that is less than the first carry bit-to-bit pair ratio. The multiple sections can further include a third section, which uses the corresponding propagation and generation signals for each bit pair in a third sequential set of bit pairs to generate third primary carry bits at a third carry bit-to-bit pair ratio that is equal to the first carry bit-to-bit pair ratio.

As mentioned above, for optimal performance, the specific bit pairs for which the primary carry bits are generated in the different sections will vary depending upon whether the maximum operand size of the adder (i.e., the maximum number of bits in the addends) is an odd number of bits or an even number.

Each embodiment of the disclosed adder can further include a sum circuit. This sum circuit can be configured to receive the primary carry bits and can include multiple ripple carry adders (RCAs), which are configured to use primary carry bits during generation of secondary carry bits and sum bits for computation of a final sum. It should, however, be understood that the configuration for the RCAs within the sum circuit will vary depending upon which primary carry bits are generated.

Also disclosed herein are specific exemplary embodiments of such an adder. Again, the adder can include a signals generation circuit, which is configured to receive the two addends and to generate corresponding propagation and generation signals for all bit pairs of same position bits in the two addends. For example, addends A and B can each have n bits, where n is some number greater than sixteen and, optionally, no greater than 32. The signals generation circuit can generate corresponding propagation and generation signals for bit pairs: A[0]B[0]; A[1]B[1]; . . . ; and A[n−1],B[n−1]. As mentioned above, generation of the propagation and generation signals is discussed in greater detail within the detailed description section of the specification below.

The adder can further include a primary carry bit generation circuit configured to receive the corresponding propagation and generation signals and to non-uniformly generate primary carry bits. Specifically, the primary carry bit generation circuit can include multiple sections and, particularly, a first section, a second section and a third section.

The first section can use the corresponding propagation and generation signals for each bit pair in a first sequential set of bit pairs to generate first primary carry bits at a first carry bit-to-bit pair ratio. In this case, the first sequential set includes the first bit pair A[0]B[0] corresponding to the LSB position, the second bit pair A[1]B[1], and so on up to and including the eighth bit pair A[7]B[7]. Furthermore, the first section can have a sparsity-2 configuration such that the first carry bit-to-bit pair ratio is 1:2.

The second section can use the corresponding propagation and generation signals for each bit pair in a second sequential set of bit pairs to generate second primary carry bits at a second carry bit-to-bit pair ratio. In this case, the second sequential set includes the ninth bit pair A[8]B[8], the tenth bit pair A[9]B[9], and so on up to and including the sixteenth bit pair A[15]B[15]. Furthermore, the second section can have a sparsity-4 configuration such that the second carry bit-to-bit pair ratio is 1:4.

The third section can use the corresponding propagation and generation signals for each bit pair in a third sequential set of bit pairs to generate third primary carry bits at a third carry bit-to-bit pair ratio. In this case, the third sequential set includes the seventeenth bit pair A[16]B[16] and any additional bit pairs up to the bit pair A[n−1]B[n−1] for the most significant bit (MSB) position. A[n−1]B[n−1] can be, for example, A[22]B[22] for 23-bit addends, A[23]B[23] for 24-bit addends, etc. Furthermore, the third section can have a sparsity-2 configuration such that the third carry bit-to-bit pair ratio, like the first, is 1:2.

As mentioned above, for optimal performance, the specific bit pairs for which the primary carry bits are generated in the different sections will vary depending upon whether the maximum operand size of the adder (i.e., the maximum number of bits in the addends) is an odd number of bits or an even number. For example, for an adder configured to compute the sum of addends having an odd maximum number of bits (e.g., 23, 25, 27, etc.), the first primary carry bits can be C1, C3, and C5, the second primary carry bits can be C9 and C13, and the third primary carry bits can be C17, C19, C21 and so on (depending on the total number of bits). Alternatively, for an adder configured to compute the sum of addends having an even maximum number of bits (e.g., 22, 24, 26, etc.), the first primary carry bits can be C2, C4, and C6, the second primary carry bits can be C10 and C14, and the third primary carry bits can be C18, C20, C22 and so on (depending on the total number of bits).

In any case, the adder can further include a sum circuit. This sum circuit can be configured to receive the primary carry bits and can include multiple ripple carry adders (RCAs), which are configured to use primary carry bits during generation of secondary carry bits and sum bits for computation of a final sum. It should, however, be understood that the configuration for the RCAs will vary depending upon which primary carry bits are generated.

Also disclosed herein are embodiments of a method of forming a parallel prefix adder, as described above, to compute a sum of two addends.

To form the adder, the method can include determining what the maximum number of bits per addend will be and also noting whether that maximum number is an odd number or an even number.

To form the adder, the method can further include forming a signals generation circuit that is configured to receive the two addends and to generate corresponding propagation and generation signals for all bit pairs of same position bits in the two addends. For example, the signals generation circuit can be formed so that, for addends A and B each having n-bits from the least significant bit (LSB) [0] to the most significant bit (MSB) [n−1], corresponding propagation and generation signals can be generated for bit pairs: A[0]B[0]; A[1]B[1]; . . . ; and A[n−1],B[n−1]. Generation of the propagation and generation signals is discussed in greater detail within the detailed description section of the specification below.

To form the adder, the method can further include forming a primary carry bit generation circuit that is configured to receive the corresponding propagation and generation signals and to generate primary carry bits that are associated with some of those bit pairs.

Specifically, as discussed in greater detail in the detailed description section of the specification, the generated primary carry bits will be associated with specific bit pairs and those bit pairs will vary (i.e., will be different) depending upon whether the maximum number of bits in the addends is an odd number or an even number. In any case, the primary carry bit generation circuit can be formed so as to include multiple sections including a first section, a second section and a third section. That is, the process of forming the primary carry bit generation circuit can include forming a first section that is configured to use the corresponding propagation and generation signals for each bit pair in a first sequential set of bit pairs to generate first primary carry bits at a first carry bit-to-bit pair ratio. The process of forming the primary carry bit generation circuit can further include forming a second section that is configured to use the corresponding propagation and generation signals for each bit pair in a second sequential set of bit pairs to generate second primary carry bits at a second carry bit-to-bit pair ratio that is less than the first carry bit-to-bit pair ratio. The process of forming the primary carry bit generation circuit can further include forming a third section that is configured to use the corresponding propagation and generation signals for each bit pair in a third sequential set of bit pairs to generate third primary carry bits at a third carry bit-to-bit pair ratio that is equal to the first carry bit-to-bit pair ratio.

To form the adder, the method can further include forming a sum circuit, which is configured to receive primary carry bits and which is further configured with multiple ripple carry adders (RCAs) that use the primary carry bits during generation of secondary carry bits and sum bits for computation of a final sum. It should, however, be understood that the configuration for the RCAs within the sum circuit will vary depending upon which primary carry bits are generated.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
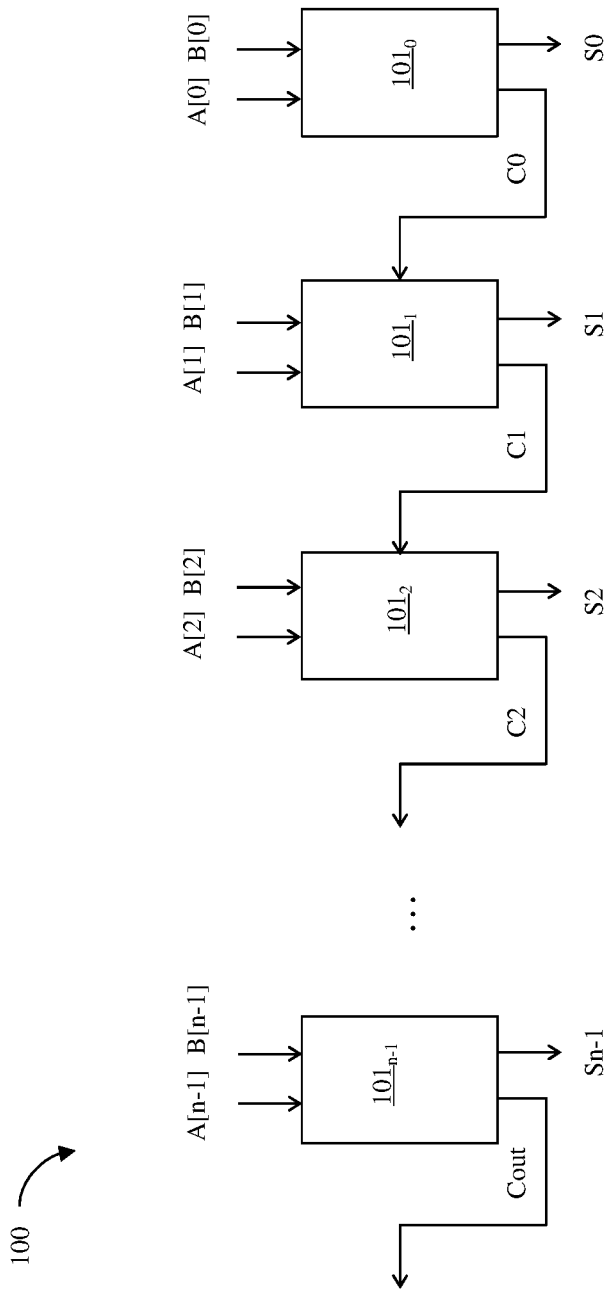
FIG. 1 is a schematic diagram illustrating a conventional Ripple Carry adder.

As mentioned above, adders are fundamental logic blocks, which can be incorporated into an integrated circuit (IC) structure to perform a binary addition operation. For applications that require complex arithmetic operations and, particularly, addition where the word size is relatively large (e.g., 16 bits, 32 bits, 64 bits, etc.) an optimized arithmetic logic block that includes multiple adders may be employed. A ripple carry adder (RCA) 100, as shown in FIG. 1, is a conventional adder that includes a predetermined number (n) of cascading full adders (FAs) in series and configured to add together two n-bit binary words (referred to herein as addends). In the RCA 100, the first FA $101_0$ receives, as inputs, the least significant bits (LSBs) (A[0]B[0]) from the two addends and outputs a sum bit (S0) and a carry bit (C0) for that LSB position; the second FA $101_1$ receives, as inputs, the next-to-LSBs (A[1]B[1]) from the two addends and the carry bit (C0) from the first FA $101_0$ and outputs a sum bit (S1) and a carry bit (C1) for that bit position; and so on until the last FA $101_{n-1}$ receives, as inputs, the most significant bits (MSBs) (A[n-1]B[n-1]) from the two addends and a carry bit (Cn-1-1) from the next to last FA $101_{n-1-1}$ and outputs a last sum bit (Sn-1) and final carry bit (Cout) for the MSB position. Unfortunately, since the bits of the two addends are added together in sequence from the LSBs to the MSBs, RCAs are associated with significant delay (i.e., poor performance).

Figure 2:
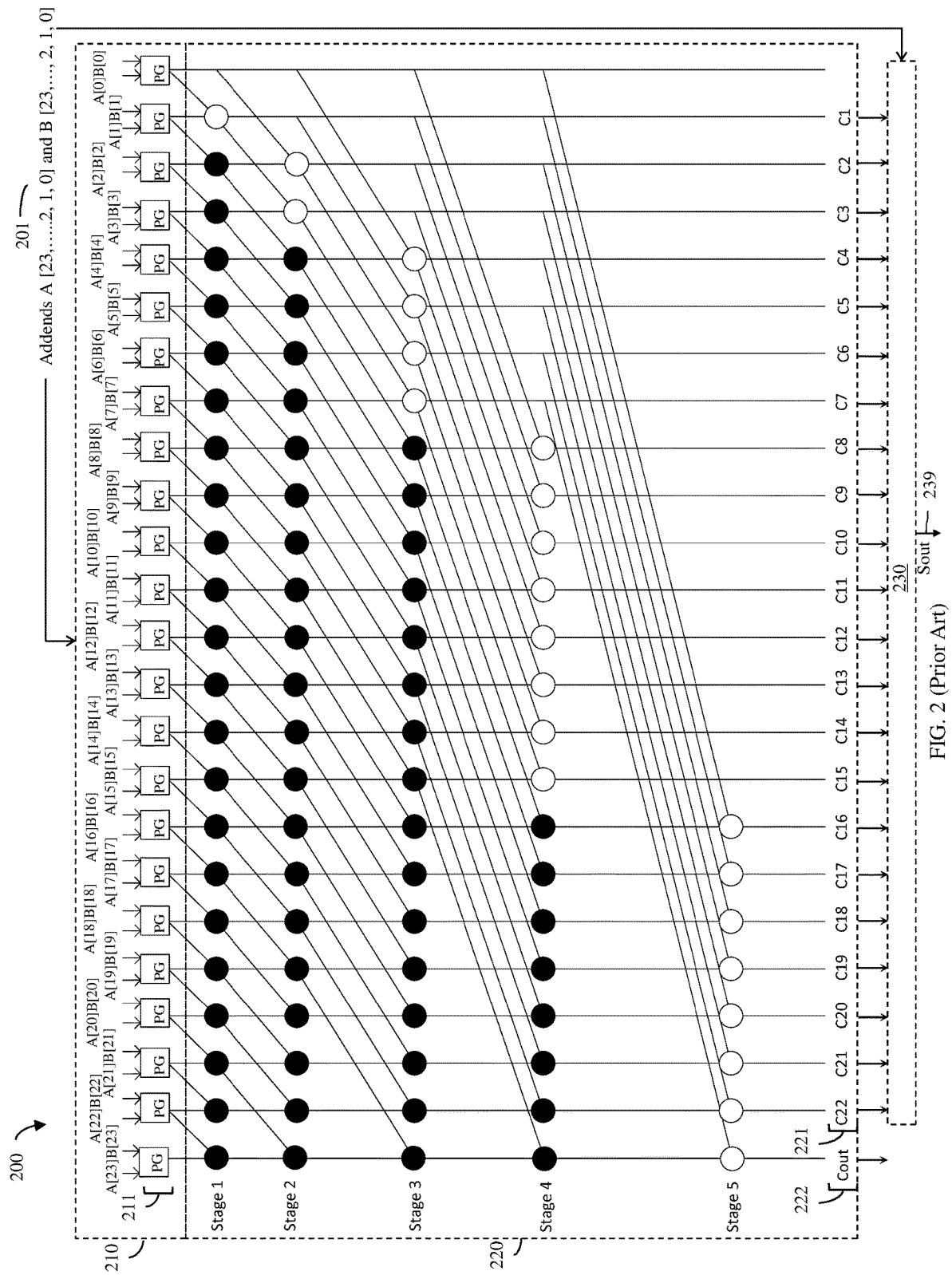
FIG. 2 is a schematic diagram illustrating a conventional Kogge-Stone Adder (KSA) with a sparsity-1 configuration.
Figure 3:
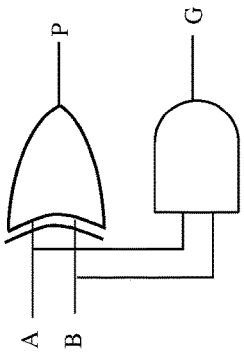
FIG. 3 is legend for use with the KSAs of FIGS. 2, 4 and 5 and also for use with the disclosed parallel prefix adders (e.g., FIGS. 6A-6B and 7A-7B)

Alternative adder configurations have been developed to reduce this delay (i.e., to improve performance). For example, FIG. 2 shows a parallel prefix adder and, particularly, an exemplary Kogge-Stone Adder (KSA) 200 for adding two addends and, particularly, two multi-bit binary words (A and B). For purposes of illustration, the KSA 200 is shown as being configured to add together two 24-bit binary words, each having bits [0]-[23], where [0] is the least significant bit (LSB) and [23] is the most significant bit (MSB). FIG. 3 shows a legend for the KSA 200 shown in FIG. 2. Referring to FIG. 2, the KSA 200 includes a propagation and generation (P&G) signals generation circuit 210. This P&G signals generation circuit 210 can process the same position bit pairs from the two addends A and B (i.e., bit pair A[0]B[0]; bit pair A[1]B[1]; bit pair A[2]B[2]; . . . ; bit pair A[23]B[23]) to generate an initial propagation signal (P) and an initial generation signal (G) for each bit pair (i.e., corresponding G&P signals 211). As indicated in the legend of FIG. 3, XOR and AND logic gates are used to determine P and G, respectively. Specifically, for each bit pair, P=A XOR B and G=A AND B.

The KSA 200 can further include a carry bit generation circuit 220 (also referred to in the art as a carry bit generation tree or adder tree), which receives the P and G signals for each bit pair in parallel (see bit position columns) and uses those P and G signals to pre-compute carry bits (C) (also referred to in the art as carry flags) for each bit pair. Specifically, the carry bit generation circuit 220 includes multiple P and G processing stages (indicated by the rows) and the number of rows is a function of the number of bits the addends. In the exemplary KSA provided, there are five stages or rows. As indicated in the legend of FIG. 3, each dot within the carry bit generation circuit 220 represents specific logic operations performed on inputs received from the same bit position of the previous stage (i.e., the same column and immediately preceding row) and from a less significant bit position from the previous stage (i.e., from some early column and the immediately preceding row, as indicated by the branches of the tree structure). The black dot indicates that logic operations are performed to acquire a Pj value and a Gj value, as follows: (1) Pj=Pi AND PH, where Pi refers to a P input received from the same bit position of the previous stage, Ph refers a P input received from a less significant bit position from the previous stage (as indicated by the tree), and Pj refers to the P output; and (2) Gj=(Pi AND Gh) OR Gi, where Gi refers to a G input received from the same bit position of the previous stage, Gh refers a G input received from a less significant bit position from the previous stage (as indicated by the tree), and Gj refers to the G output. The white dot indicates that logic operations are performed to acquire only the Gj value mentioned above. This carry bit generation circuit 220 produces a corresponding carry bit (C) for each bit pair including intermediate carry bits 221 (i.e., C's for up to the next to MSB position, which in this case are C0-C22) and a final carry bit 222 (Cout) (i.e., C for the MSB position, which in this case is C23).

The KSA 200 can further include a sum circuit 230, which uses the intermediate carry bits 221 produced by the carry bit generation circuit 220 and the bit pairs from the addends 201 to determine and output a final sum (Sout) 239, which includes sum bits computed for each bit position.

The advantage of this KSA 200 structure is that the carry bits C0-C23 are pre-computed in the carry bit generation circuit 220, in parallel, thereby reducing the logic depth and increasing the speed at which the final sum (Sout 239) is computed. However, this advantage comes at a significant cost and, particularly, a significant increase in both area and power consumption.

Figures 4, 5:
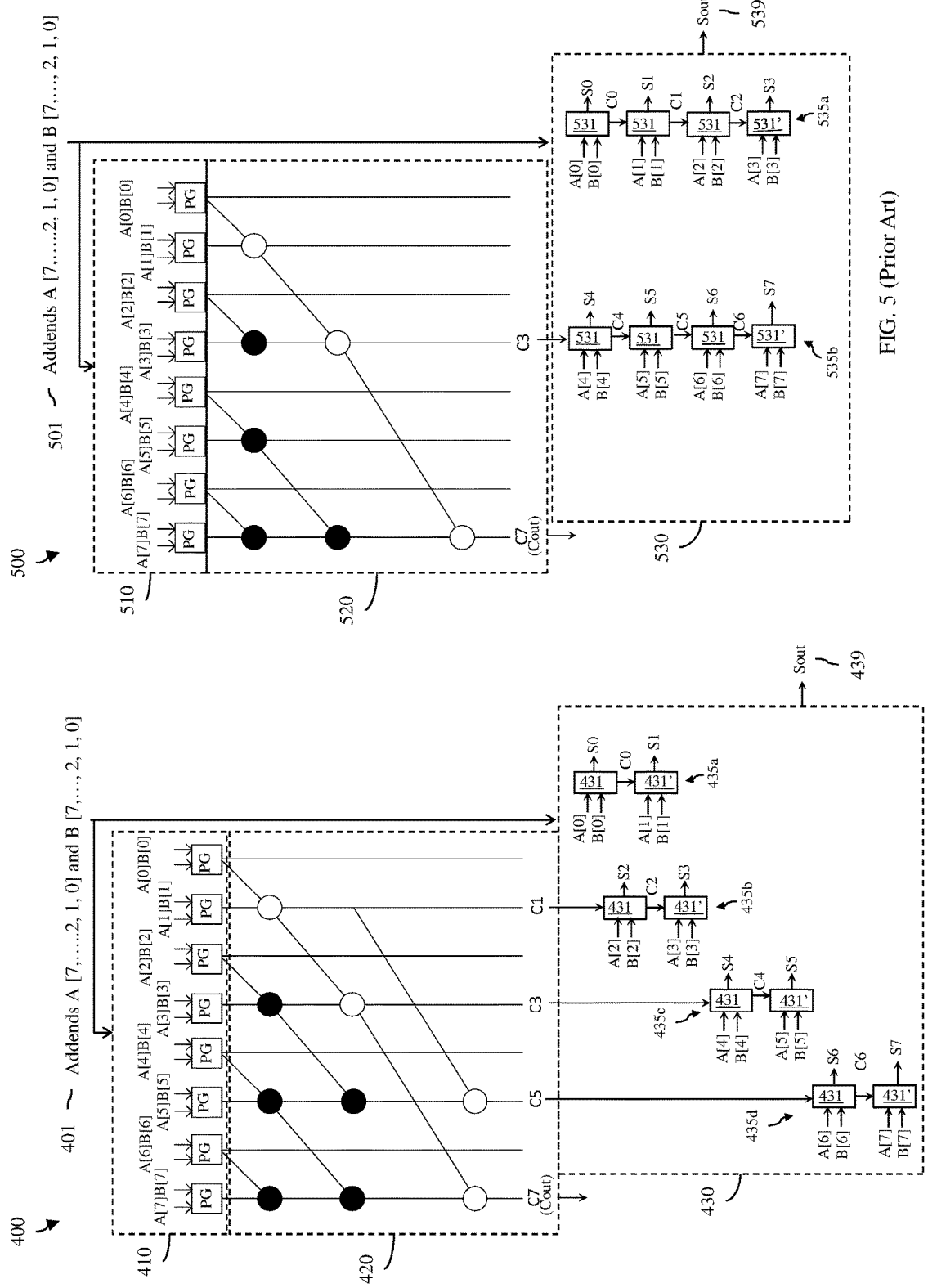
FIG. 4 is a schematic diagram illustrating a KSA with a sparsity-2 configuration.
FIG. 5 is a schematic diagram illustrating a KSA with a sparsity-4 configuration.

Sparse KSA structures have recently been developed to balance out these costs. FIGS. 4 and 5 illustrate a sparse KSA 400 and a sparse KSA 500, respectively, for adding two addends 401, 501 and, particularly, two multi-bit binary words (A and B). For purposes of illustration, the KSAs 400, 500 are shown as being configured to add together two 8-bit binary words, each having bits 0-7, where 0 is the least significant bit (LSB) and 7 is the most significant bit (MSB). Like the KSA 200 described above, each of these sparse KSAs 400, 500 include: a P&G signals generation circuit 410; 510; a carry bit generation circuit 420, 520 (also referred to in the art as a carry bit generation tree or an adder tree); and a sum circuit 430, 530. It should be noted that the legend shown in FIG. 3 also applies to the KSAs 400, 500 of FIGS. 4 and 5.

In any case, the P&G signals generation circuit 410, 510 in each sparse KSA 400, 500 can process the same position bit pairs from the two addends A and B (i.e., bit pairs: A[0]B[0]; A[1]B[1]; A[2]B[2]; . . . ; A[7]B[7]) to generate an initial propagation signal (P) and an initial generation signal (G) for each bit pair.

Referring specifically to the sparse KSA 400 of FIG. 4, the carry bit generation circuit 420 can be sparsity-2 adder tree. A "sparsity-2 adder tree" refers to an adder tree that receives the P and G signals for each bit pair from the P&G signals generation circuit 410 and outputs primary carry bits for every second bit pair (e.g., see primary carry bits C1, C3, C5 and C7, where C7 is the final carry bit Cout). Since not all of the carry bits required to compute Sout are generated by the carry bit generation circuit 420, the sum circuit 430 includes several smaller ripple carry adders (RCAs) 435a-d (each with a pair of full adders 431 in series) to generate the rest of the carry bits (e.g., secondary carry bits C0, C2, C4 and C6) and also the sum bits (e.g., S0-S7) for the final sum (Sout) 439. As indicated, the last full adder 431' in each RCA 435a-d adder chain does not produce a carry bit, since that carry bit has already been pre-computed by the carry bit generation circuit 420.

Referring specifically to the sparse KSA 500 of FIG. 5, the carry bit generation circuit 520 can be sparsity-4 adder tree. A "sparsity-4 adder tree" refers to an adder tree that receives the P and G signals for each bit pair from the P&G signals generation circuit 510 and outputs primary carry bits for every fourth bit pair (e.g., see primary carry bits C3 and C7, where C7 is the final carry bit Cout). Since not all of the required carry bits are generated by the carry bit generation circuit 520, the sum circuit 530 includes several small RCAs 535a-b (each with four full adders 531 in series) to generate the rest of the carry bits (e.g., secondary carry bits C0, C1, C2, C4, C5, and C6) and also the sum bits (e.g., S0-S7) for the final sum (Sout) 539. As indicated, the last full adder 531' in each RCA 535a-b adder chain does not produce a carry bit, since that carry bit has already been pre-computed by the carry bit generation circuit 520.

The advantage of these sparse KSAs 400, 500 is that at least some of the carry bits are pre-computed in the carry bit generation circuit 420, 520, in parallel, thereby at least somewhat reducing the logic depth and increasing the speed at which the final sum (Sout) is generated. However, since not all the carry bits are pre-computed, there is less of an increase in area and power consumption. Neither of these two sparse KSA structures is, however, optimal. Thus, there is a need in the art for adder structure that better balances the design goals of reducing delay, reducing area consumption, reducing power consumption, and reducing routing congestion.

In view of the foregoing, disclosed herein are embodiments of a parallel prefix adder structure that balances the design goals of reducing delay, reducing area consumption, reducing power consumption, and reducing routing congestion and a method of forming the structure. Specifically, the parallel prefix adder structure incorporates a carry bit generation circuit (also referred to herein as a carry bit generation tree or adder tree), which is configured to generate primary carry bits for at least some bit pairs and a sum circuit, which includes multiple relatively small ripple carry adders (RCAs) that use these primary carry bits to generate secondary carry bits as well as sum bits for computation of a final sum. However, unlike carry bit generation circuits in prior art adders where the primary carry bits are uniformly generated (e.g., at every second bit pair in the case of a sparsity-2 configuration or at every fourth bit pair in the case of a sparsity-4 configuration), the disclosed carry bit generation circuit has different sections, which process different sequential sets of bit pairs and which have different sparsity configurations such that generation of the primary carry bits is non-uniform. That is, in the different sections the primary carry bits are generated at different carry bit-to-bit pair ratios (e.g., the different carry bit-to-bit pair ratios for the different sections can be 1:2, 1:4, and 1:2, respectively). For optimal performance, the specific bit pairs for which these primary carry bits are generated will vary depending upon whether the maximum operand size of the adder is an odd number of bits or an even number. Such a parallel prefix adder can be used to achieve a significant decrease in area and power consumption (e.g., by up to 25% or more) and a significant decrease in dynamic power consumption (e.g., by up to 25% or more) with only a minimal increase in delay (e.g., by less than 5%) as compared to conventional Kogge-Stone Adder (KSA).

Figure 6:
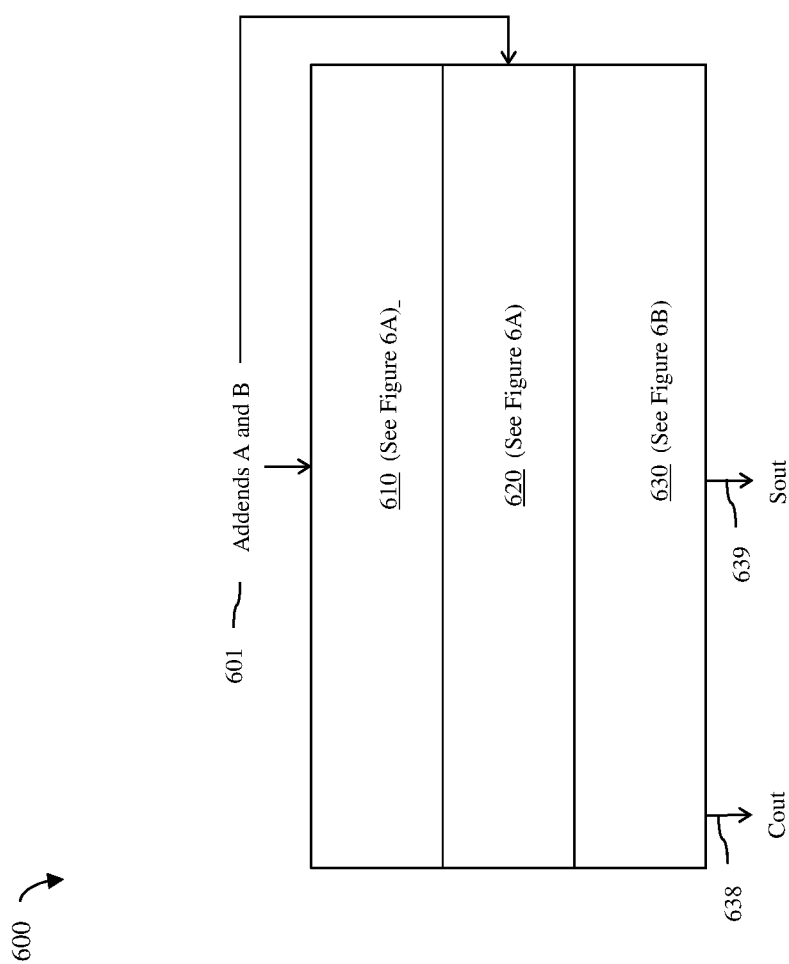
FIG. 6 is schematic diagram illustrating an embodiment of a disclosed parallel prefix adder.
Figure 6A:
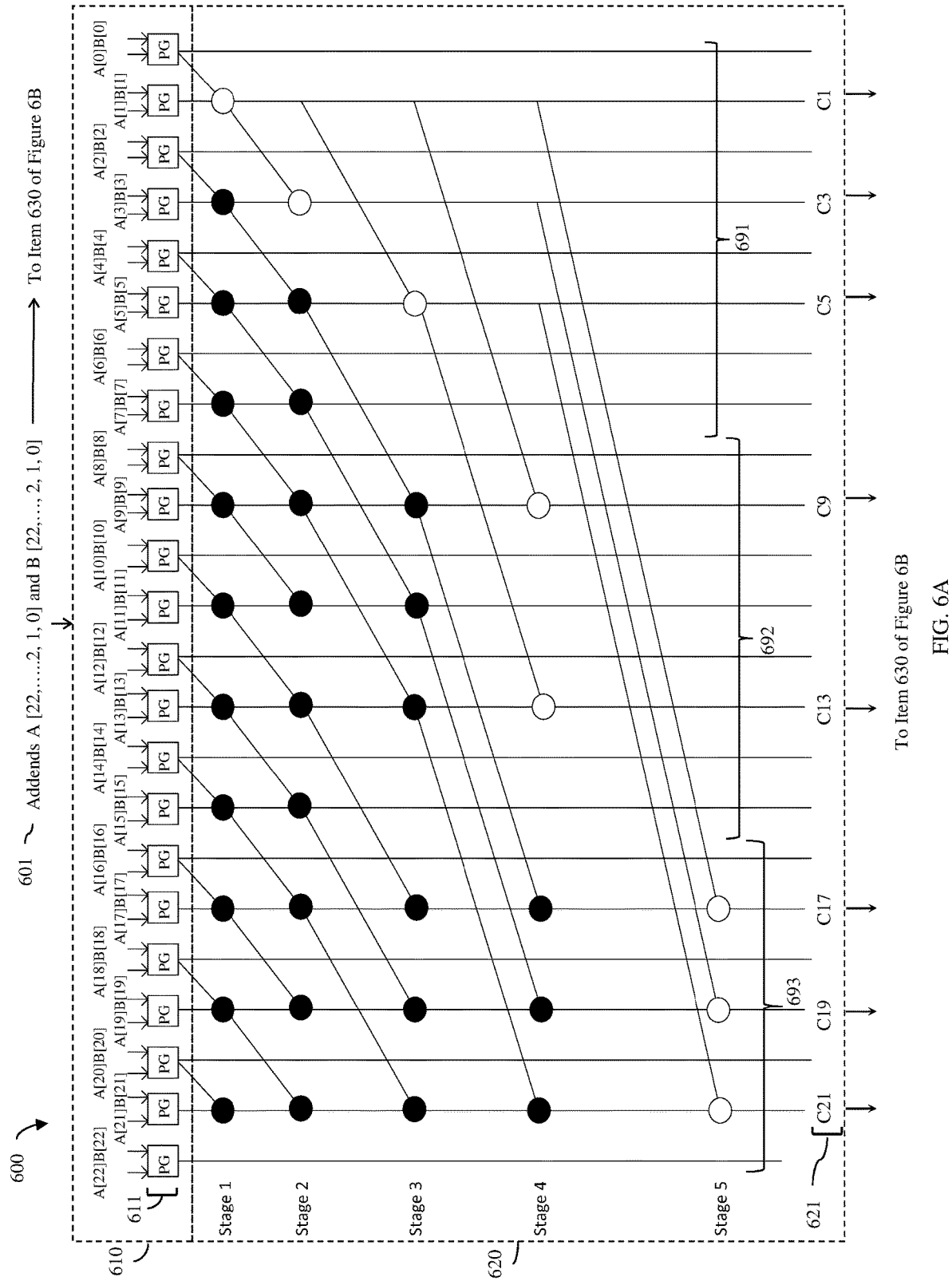
FIG. 6A is a more detailed schematic diagram illustrating a signals generation circuit and a primary carry bit generation circuit of the parallel prefix adder of FIG. 6.
Figure 6B:
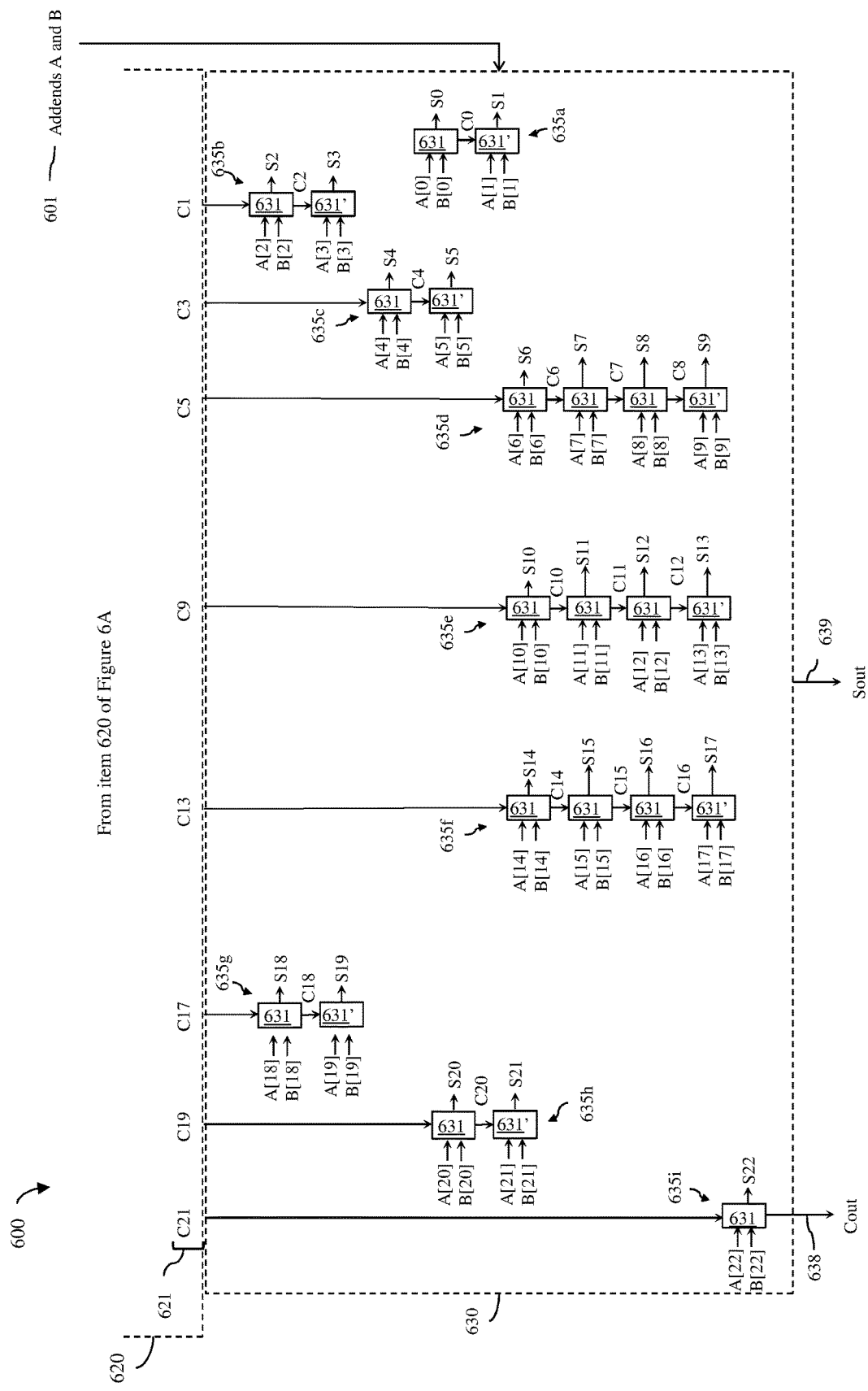
FIG. 6B is a more detailed schematic diagram illustrating a sum circuit of the parallel prefix adder of FIG. 6.
Figure 7:
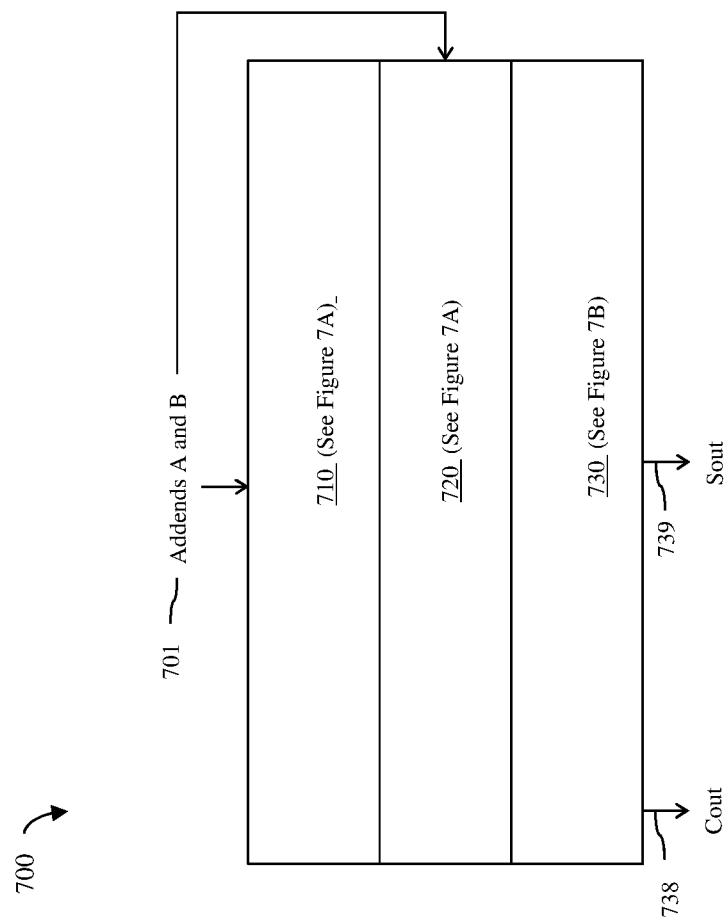
FIG. 7 is a schematic diagram illustrating another embodiment of a disclosed parallel prefix adder.
Figure 7A:
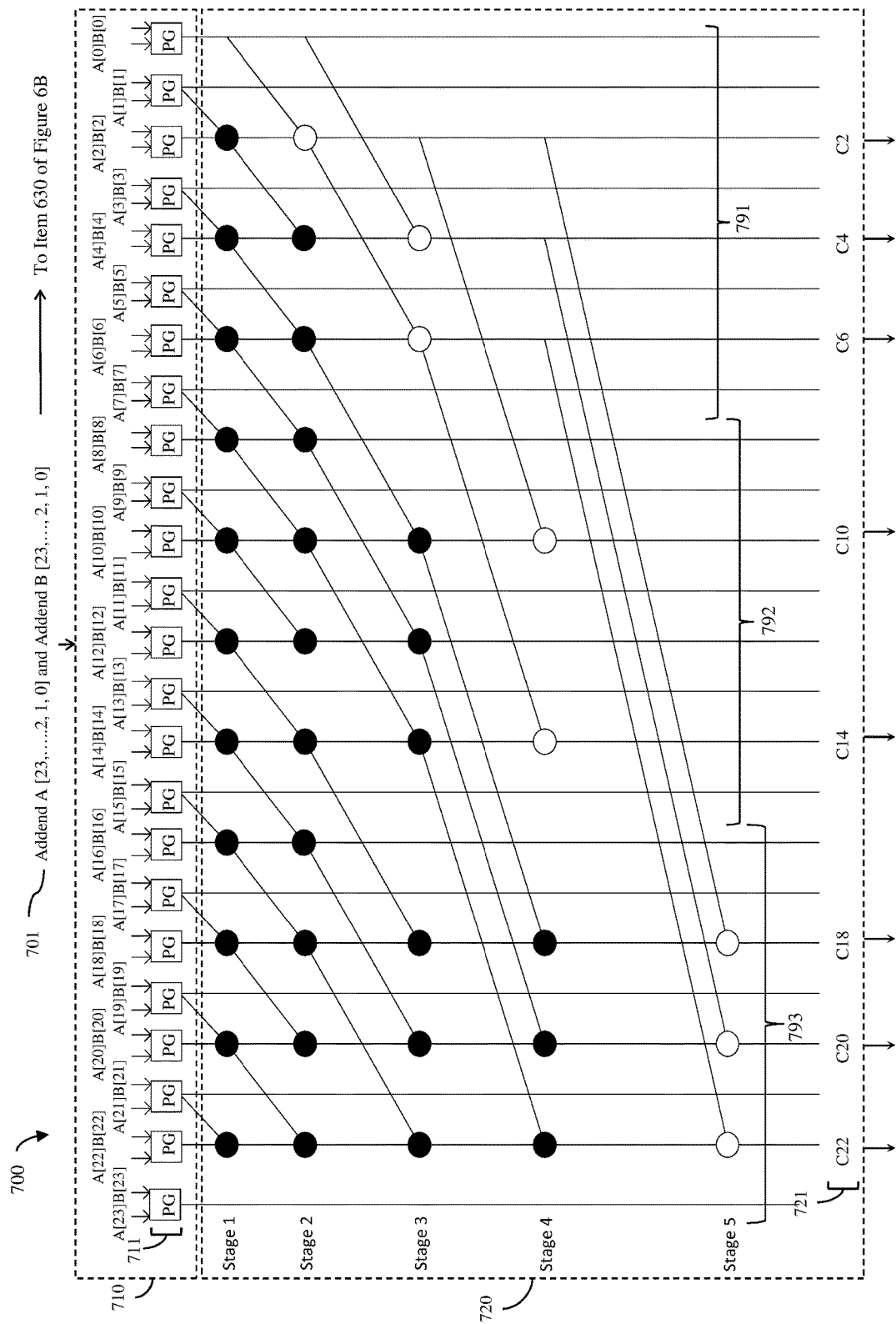
FIG. 7A is a more detailed schematic diagram illustrating a signals generation circuit and a primary carry bit generation circuit of the parallel prefix adder of FIG. 7.
Figure 7B:
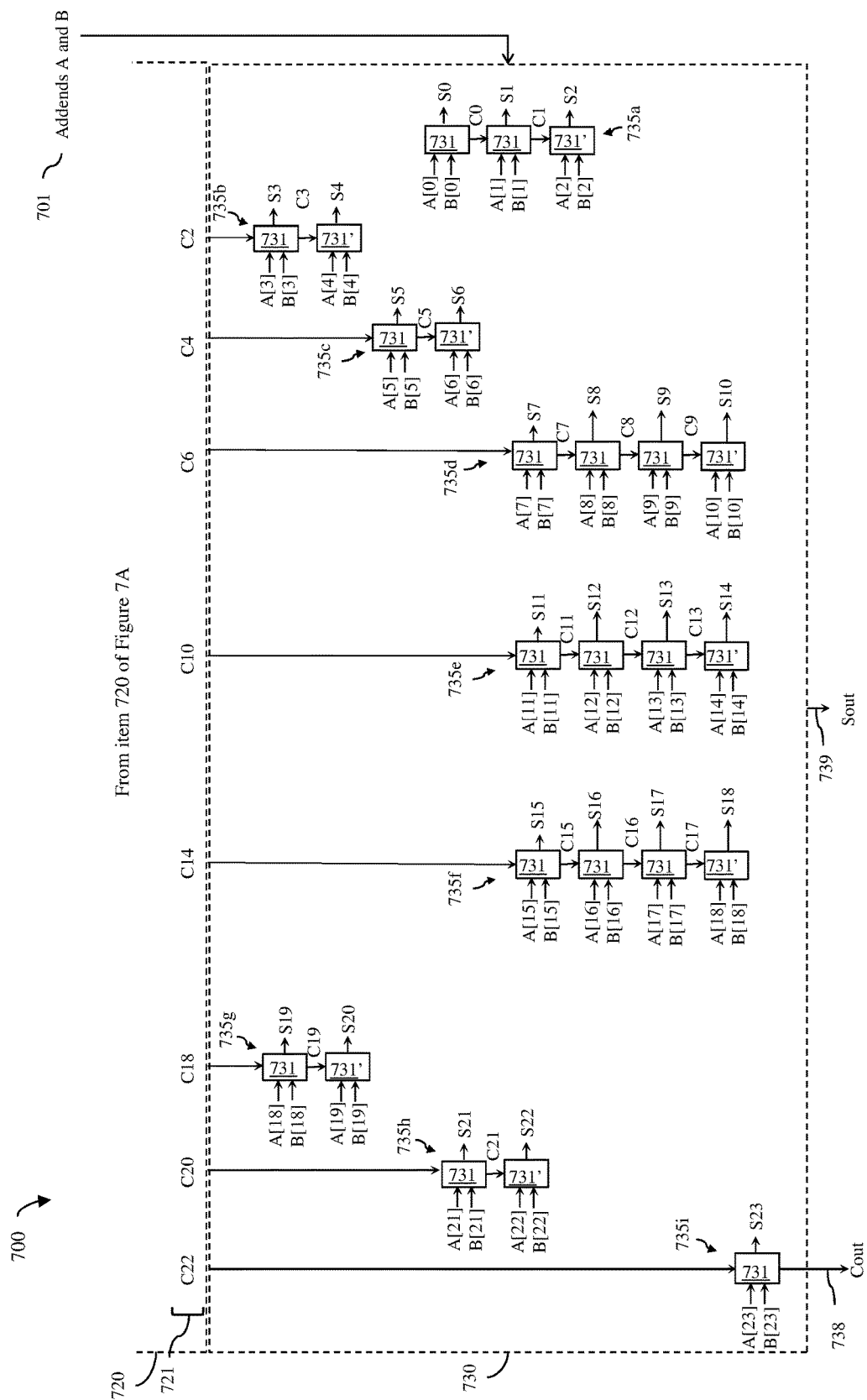
FIG. 7B is a more detailed schematic diagram illustrating a sum circuit of the parallel prefix adder of FIG. 7.

More particularly, FIG. 6 is schematic diagram illustrating an embodiment of a disclosed parallel prefix adder 600, which includes: a signal generation circuit 610 that receives to addends 601; a primary carry bit generation circuit 620 having different sections, which process different sequential sets of bit pairs and which have different sparsity configurations; and a sum circuit 630, which outputs the sum 639 of the two addends 601. FIGS. 6A and 6B, in combination, provide a more detailed schematic diagram illustrating the adder 600 and, particularly, the signals generation circuit 610 and the primary carry bit generation circuit 620 (see FIG. 6A) and the sum circuit 630 (see FIG. 6B). FIG. 7 is schematic diagram illustrating another embodiment of a disclosed parallel prefix adder 700, which includes: a signal generation circuit 710 that receives to addends 701; a primary carry bit generation circuit 720 having different sections, which process different sequential sets of bit pairs and which have different sparsity configurations; and a sum circuit 730, which outputs the sum 739 of the two addends 701. FIGS. 7A and 7B, in combination, provide a more detailed schematic diagram illustrating the signals generation circuit 710 and the primary carry bit generation circuit 720 (see FIG. 7A) and the sum circuit 730 (see FIG. 7B).

Referring to FIGS. 6A-6B and 7A-7B, the adder 600, 700 can include a signals generation circuit 610, 710, which is configured to receive inputs 601, 701 and, particularly, to receive two addends (i.e., addend A and addend B). These addends A and B can be multi-bit binary words (i.e., n-bit binary words, where n is the maximum number of bits per addend or maximum operand size of the adder). This maximum number n of bits can be, for example, some number greater than sixteen and, optionally, no greater than 32. Thus, addend A can be expressed as A[n−1, . . . , 2, 1, 0] and added B can be expressed as B[n−1, . . . , 2, 1, 0], where 0 refers to the first bit (also referred to as the least significant bit (LSB)) in the binary word and n−1 refers to last bit (also referred to as the most significant bit (MSB)) in the binary word. For purposes of illustration, the embodiment of the adder 600 shown in FIGS. 6A-6B is a 23-bit adder, where the inputs 601 are A[22, . . . , 2, 1, 0] and B[22, . . . , 2, 1, 0] and the embodiment of the adder 700 shown in FIGS. 7A-7B is a 24-bit adder, where the inputs 701 are A[23, . . . , 2, 1, 0] and B[23, . . . , 2, 1, 0]. It should, however, be understood that the embodiments shown in FIGS. 6A-6B and 7A-7B are not intended to be limiting and, alternatively, the disclosed adder could have a different maximum operand size.

In any case, the signals generation circuit 610, 710 can be configured to form a total of n bit pairs from the two addends A and B, where each bit pair includes two bits, one bit from addend A and one bit from addend B and where the two bits are from the same exact bit position. Thus, the bit pairs will include: A[0]B[0]; A[1]B[1]; A[2]B[2]; . . . ; and A[n−1]B[n−1]. For example, in the embodiment of the adder 600 shown in FIGS. 6A-6B, the bit pairs will include: A[0]B[0]; A[1]B[1]; A[2]B[2]; . . . ; and A[22]B[22], whereas in the embodiment of the adder 700 shown in FIGS. 7A-7B, the bit pairs will include: A[0]B[0]; A[1]B[1]; A[2]B[2]; . . . ; and A[23]B[23]. The signals generation circuit 610, 710 can further be configured to generate corresponding initial propagation (P) and generation (G) signals 611, 711 for each of the bit pairs (i.e., for A[0]B[0]; A[1]B[1]; . . . ; and A[n−1],B[n−1]). Specifically, as indicated in the legend of FIG. 3, the signals generation circuit 610, 710 can include n sets of XOR and AND logic gates. The XOR and AND logic gates in a given set can receive a given bit pair and can output P and G, respectively (i.e., P=A XOR B and G=A AND B) for that given bit pair such that the corresponding P and G signals for all of the bit pairs are output in parallel.

The adder 600, 700 can further include a primary carry bit generation circuit 620, 720 (also referred to herein as a carry bit generation tree or adder tree). The primary carry bit generation circuit 620, 720 can be configured to receive the corresponding P and G signals 611, 711 for all the bit pairs, in parallel, and to generate primary carry bits (C) 621, 721 for some, but not all, of those bit pairs in parallel, as discussed in greater detail below.

It should be noted that the legend of FIG. 3 applies to this primary carry bit generation circuit 620, 720. That is, each dot within the carry bit generation circuit 620, 720 represents specific logic operations performed on inputs received from the same bit position of the previous stage (i.e., the same column and immediately preceding row) and from a less significant bit position from the previous stage (i.e., from some early column and the immediately preceding row, as indicated by the branches of the tree structure). The black dot indicates that logic operations are performed to acquire a Pj value and a Gj value, as follows: (1) Pj=Pi AND PH, where Pi refers to a P input received from the same bit position of the previous stage, Ph refers a P input received from a less significant bit position from the previous stage (as indicated by the tree), and Pj refers to the P output; and (2) Gj=(Pi AND Gh) OR Gi, where Gi refers to a G input received from the same bit position of the previous stage, Gh refers a G input received from a less significant bit position from the previous stage (as indicated by the tree), and Gj refers to the G output. The white dot indicates that logic operations are performed to acquire only the Gj value mentioned above. Thus, the types of logic operations performed by the primary carry bit generation circuit 620, 720 in the adder 600, 700 are the same as those performed by primary carry bit generation circuits in prior art adders. However, unlike the carry bit generation circuits in prior art adders, the disclosed primary carry bit generation circuit 620, 720 is configured such that generation of the primary carry bits is non-uniform (i.e., not at every bit pair, every second bit pair, every fourth bit pair, etc.).

Specifically, the primary carry bit generation circuit 620, 720 can include multiple sections 691-693, 791-793. The multiple sections can include a first section 691, 791, which uses the corresponding P and G signals for each bit pair in a first sequential set of bit pairs to generate first primary carry bits at a first carry bit-to-bit pair ratio. The multiple sections can include second section 692, 792, which uses the corresponding P and G signals for each bit pair in a second sequential set of bit pairs to generate second primary carry bits at a second carry bit-to-bit pair ratio that is less than the first carry bit-to-bit pair ratio. The multiple sections can further include a third section 693, 793, which uses the corresponding P and G signals for each bit pair in a third sequential set of bit pairs to generate third primary carry bits at a third carry bit-to-bit pair ratio that is equal to the first carry bit-to-bit pair ratio.

It should be understood the sequential sets of bit pairs, mentioned above, are different non-overlapping subsets of all of the bit pairs in sequence with the first sequential set including, but not limited to, the bit pair corresponding to the LSB position (i.e., A[0]B[0]), the third sequential set including, but not limited to, the bit pair corresponding to the MSB position (i.e., A[n−1]B[n−1]) and the second sequential set including all bit pairs between those in the first first sequential set and those in the third sequential set. Furthermore, it should be understood that the carry bit-to-bit pair ratio of a given section is indicative of the sparsity configuration for that section only. For example, a carry bit-to-bit pair ratio of 1:1 for a given section would indicate that a primary carry bit would be generated for every bit pair within that section (i.e., a sparsity-1 configuration or non-sparse configuration); a carry bit-to-bit pair ratio of 1:2 for a given section would indicate that a primary carry bit will be generated for 1 out of every two bit pairs within that section (i.e., a sparsity-2 configuration); a carry bit-to-bit pair ratio of 1:4 for a given section would indicate that a primary carry bit will be generated for 1 out of every four bit pairs within that section (i.e., a sparsity-4 configuration); and so on.

Thus, for example, in the exemplary embodiments shown in FIGS. 6A-6B and 7A-7B, the first sequential set of bit pairs in the first section 691, 791 includes the first eight bit pairs (i.e., the first bit pair A[0]B[0] corresponding to the LSBs of the two addends A and B, the second bit pair A[1]B[1], the third bit pair A[2]B[2], the fourth bit pair A[3]B[3], the fifth bit pair A[4]B[4], the sixth bit pair A[5]B[5], the seventh bit pair A[6]B[6] and the eighth bit pair A[7]B[7]); the second sequential set of bit pairs in the second section 692, 792 includes the next eight bit pairs (i.e., the ninth bit pair A[8]B[8], the tenth bit pair A[9]B[9], the eleventh bit pair A[10]B[10], the twelfth bit pair A[11]B[11], the thirteenth bit pair A[12]B[12], the fourteenth bit pair A[13]B[13], the fifteenth bit pair A[14]B[14] and the sixteenth bit pair A[15]B[15]); and the third sequential set of bit pairs in the third section 693, 793 includes the seventeenth bit pair A[15]B[15] up to a last bit pair A[n−1]B[n−1] corresponding to the MSB position of the two addends A and B (e.g., A[22]B[22] in the adder 600 of FIGS. 6A-6B and A[23]B[23] in the adder 700 of FIGS. 7A-7B). Furthermore, in the exemplary embodiments shown in FIGS. 6A-6B and 7A-7B, the first section 691, 791 is configured with a first carry bit-to-bit pair ratio of 1:2 (i.e., it has a sparsity-2 configuration); the second section 692, 792 is configured with a second carry bit-to-bit pair ratio of 1:4 (i.e., it has sparsity-4 configuration); and the third section 693, 793 is configured with a third carry bit-to-bit pair ratio of 1:2 (i.e., like the first section, the third section has a sparsity-2 configuration).

For optimal performance, the specific bit pairs for which the primary carry bits are generated in the different sections 691-693, 791-793 can vary depending upon whether the maximum operand size of the adder (i.e., the maximum number n of bits in the addends) is an odd number of bits or an even number.

For example, referring to the exemplary embodiment shown in FIGS. 6A-6B, for an adder 600, which is configured to compute the sum of two addends A and B having an odd maximum number of bits (e.g., 23 bits, 25 bits, 27 bits, etc.) and which includes a primary carry bit generation circuit 620 with a first section 691 that processes bit pairs A[0]B[0]-A[7]B[7] using a sparsity-2, a second section 692 that processes bit pairs A[8]B[8]-A[15]B[15] using a sparsity-4 configuration, and a third section 693 that processes bit pairs A[16]B[16]-A[n−1]B[n−1], the arrangement of the adder tree branches can be such that the first primary carry bits that are generated by the first section 691 are carry bits C1 for the second bit pair A[1]B[1], C3 for the fourth bit pair A[3]B[3], and C5 for the sixth bit pair A[5]B[5], such that the second primary carry bits that are generated by the second section 692 are carry bits C9 for the tenth bit pair A[9]B[9] and C13 for the fourteenth bit pair A[13]B[13], and such that the third primary carry bits that are generated by the third section 693 are carry bits C17 for the eighteenth bit pair A[17]B[17], C19 for the twentieth bit pair A[21]B[21], C21 for the twenty-second bit pair A[21]B[21] and so on (depending on the total of the odd maximum number of bits).

Alternatively, referring to the exemplary embodiment shown in FIGS. 7A-7B, for an adder 700, which is configured to compute the sum of two addends A and B having an even maximum number of bits (e.g., 22 bits, 24 bits, 26 bits, etc.) and which includes a primary carry bit generation circuit 720 with a first section 791 that processes bit pairs A[0]B[0]-A[7]B[7] using a sparsity-2, a second section 792 that processes bit pairs A[8]B[8]-A[15]B[15] using a sparsity-4 configuration, and a third section 793 that processes bit pairs A[16]B[16]-A[n−1]B[n−1], the arrangement of the adder tree branches can be such that the first primary carry bits that are generated by the first section 791 are carry bits C2 for the third bit pair A[2]B[2], C4 for the fifth bit pair A[4]B[4], and C6 for the seventh bit pair A[6]B[6], such that the second primary carry bits that are generated by the second section 792 are carry bits C10 for the eleventh bit pair A[11]B[11] and C14 for the fifteenth bit pair A[16]B[16], and such that the third primary carry bits that are generated by the third section 793 are carry bits C18 for the nineteenth bit pair A[18]B[18], C20 for the twenty-first bit pair A[20]B[20], C22 for the twenty-third bit pair A[22]B[22] and so on (depending on the total maximum even number of bits).

The adder 600, 700 can further include a sum circuit 630, 730. This sum circuit 630, 730 can be configured to receive the addends A and B (i.e., inputs 601, 701) and to also receive the primary carry bits (e.g., primary carry bits C1, C3, C5, C9, C13, C17, C19 and C21 in the case of the adder 600 of FIGS. 6A-6B and primary carry bits C2, C4, C6, C10, C14, C18, C20 and C22 in the case of the adder 700 of FIGS. 7A-7B) from the primary carry bit generation circuit 620, 720.

The sum circuit 630, 730 can further be configured to form the same n bit pairs from the two addends A and B, as discussed above with regard to the signal's generation circuit 610, 710, where each bit pair includes two bits, one bit from addend A and one bit from addend B and where the two bits are from the same exact bit position.

The sum circuit 630, 730 can further include multiple ripple carry adders (RCAs), which are configured to use the bit pairs and the primary carry bits during the generation of secondary carry bits, as necessary, and also the generation of sum bits S0, S1, S2, . . . Sn−1 for each bit pair A[0]B[0], A[1]B[1], A[2]B[2], . . . A[n−1]B[n−2], respectively, in order to compute and output the final sum 639, 739 (Sout). Those skilled in the art will recognize that computation of a sum bit for a particular bit pair requires the carry bit from the immediately preceding bit pair. The "primary carry bits" simply refer to those carry bits that have been pre-computed, by the primary carry bit generation circuit, for some of the bit pairs, whereas "secondary carry bits" refer to all remaining carry bits that have not pre-computed and, thus, will be generated within the sum circuit itself.

It should be understood that the configuration for the multiple RCAs within the sum circuit will depend upon which primary carry bits are generated by the primary carry bit generation circuit.

For example, in the adder 600 of FIGS. 6A-6B the maximum operand size is an odd number (i.e., 23) and the primary carry bit generation circuit 620 generates primary carry bits C1, C3, C5, C9, C13, C17, C19 and C21. In this case, the multiple RCAs can include: first RCAs 635a-635d, which process the primary carry bits C1, C3 and C5 from the first section 691 of the primary carry bit generation circuit 620 and which generate secondary carry bits C0, C2, C4, C6, C7 and C8 as well as sum bits S0-S9; second RCAs 635e-f, which process the primary carry bits C9 and C13 from the second section 692 of the primary carry bit generation circuit 620 and which generate secondary carry bits C10-C12 and C14-C16 as well as sum bits S10-S17; and third RCAs 635g-i, which process the primary carry bits C17, C19 and C21 from the third section 693 of the primary carry bit generation circuit 620 and which generate secondary carry bits C18, C20 and C22 (also referred to as Cout 638) as well as sum bits S18-S22.

Specifically, as illustrated, the first RCA 635a includes two full adders 631 in series: one receives A[0]B[0] and outputs C0 and S0; and the other receives A[1]B[1] and C0 as inputs and outputs S1 (but not C1, which has already been pre-computed by the first section 691 of the primary carry bit generation circuit 620). The first RCA 635b includes two full adders 631 in series: one receives A[2]B[2] and C1 as inputs and outputs C2 and S2; and the other receives A[3]B[3] and C2 as inputs and outputs S3 (but not C3, which has already been pre-computed by the first section 691 of the primary carry bit generation circuit 620). The first RCA 635c includes two full adders 631 in series: one receives A[4]B[4] and C3 as inputs and outputs C4 and S4; and the other receives A[5]B[5] and C4 as inputs and outputs S5 (but not C5, which has already been pre-computed by the first section 691 of the primary carry bit generation circuit 620). The first RCA 635d includes four full adders 631 in series: one receives A[6]B[6] and C5 as inputs and outputs C6 and S6; another receives A[7]B[7] and C6 as inputs and outputs C7 and S7; yet another receives A[8]B[8] and C7 as inputs and outputs C8 and S8; and the last receives A[9]B[9] and C8 as inputs and outputs S9 (but not C9, which has already been pre-computed by the second section 692 of the primary carry bit generation circuit 620).

The second RCA 635e includes four full adders 631 in series: one receives A[10]B[10] and C9 as inputs and outputs C10 and S10, another receives A[11]B[11] and C10 as inputs and outputs C11 and S11, yet another receives A[12]B[12] and C11 as inputs and outputs C12 and S12, and the last receives A[13]B[13] and C12 as inputs and outputs S13 (but not C13, which has already been pre-computed by the second section 692 of the primary carry bit generation circuit 620). The second RCA 635f also includes four full adders 631 in series: one receives A[14]B[14] and C13 as inputs and outputs C14 and S14, another receives A[15]B[15] and C14 as inputs and outputs C15 and S15, yet another receives A[16]B[16] and C15 as inputs and outputs C16 and S16, and the last receives A[17]B[17] and C16 as inputs and outputs S17 (but not C17, which has already been pre-computed by the third section 693 of the primary carry bit generation circuit 620).

The third RCA 635g includes two full adders 631 in series: one receives A[18]B[18] and C17 as inputs and outputs C18 and S18 and the other receives A[19]B[19] and C18 as inputs and outputs S19 (but not C19, which has already been pre-computed by the third section 693 of the primary carry bit generation circuit 620). The third RCA 635h includes two full adders 631 in series: one receives A[20]B[20] and C19 as inputs and outputs C20 and S20 and the other receives A[21]B[21] and C20 as inputs and outputs S21 (but not C21, which has already been pre-computed by the third section 693 of the primary carry bit generation circuit 620). The third RCA 635i only includes a single adder 631, which receives A[22]B[22] and C21 as inputs and outputs C22 (Cout) and S22. It should be understood that the exemplary embodiment shown in FIGS. 6A-6B is not intended to be limiting and that for adders where the maximum operand size is a different odd number, the sum circuit could include a different number of third RCAs.

Additionally, as mentioned above the configuration for the multiple RCAs within the sum circuit will depend upon which primary carry bits are generated by the primary carry bit generation circuit. For example, since the primary carry bit generation circuit 720 of FIGS. 7A-7B generates different primary carry bits than the primary carry bit generation circuit 620 of FIGS. 6A-6B, the sum circuit 730 will have a different configuration than the sum circuit 630, described above.

The adder 700 of FIGS. 7A-7B has a maximum operand size that is an even number (e.g., 24) and the primary carry bit generation circuit 720 generates primary carry bits C2, C4, C6, C10, C14, C18, C20 and C22. In this case, the multiple RCAs can include: first RCAs 735a-735d, which process the primary carry bits C2, C4 and C6 from the first section 791 of the primary carry bit generation circuit 720 and which generate secondary carry bits C0, C1, C3, C5, C7, C8 and C9 as well as sum bits S0-S10; second RCAs 735e-f, which process the primary carry bits C10 and C14 from the second section 792 of the primary carry bit generation circuit 720 and which generate secondary carry bits C11-C13 and C15-C17 as well as sum bits S11-S18; and third RCAs 735g-i, which process the primary carry bits C18, C20 and C22 from the third section 793 of the primary carry bit generation circuit 720 and which generate secondary carry bits C19, C21 and C23 (also referred to as Cout 738) as well as sum bits S19-S23.

Specifically, as illustrated, the first RCA 735a includes three full adders 731 in series: one receives A[0]B[0] and outputs C0 and S0; another receives A[1]B[1] and C0 as inputs and outputs S1 and C1; and yet another receives A[2]B[2] and C1 as inputs and outputs S2 (but not C2, which has already been pre-computed by the first section 791 of the primary carry bit generation circuit 720). The first RCA 735b includes two full adders 731 in series: one receives A[3]B[3] and C2 as inputs and outputs C3 and S3; and the other receives A[4]B[4] and C3 as inputs and outputs S4 (but not C4, which has already been pre-computed by the first section 791 of the primary carry bit generation circuit 720). The first RCA 735c includes two full adders 731 in series: one receives A[5]B[5] and C4 as inputs and outputs C5 and S5; and the other receives A[6]B[6] and C5 as inputs and outputs S6 (but not C6, which has already been pre-computed by the first section 791 of the primary carry bit generation circuit 720). The first RCA 735d includes four full adders 731 in series: one receives A[7]B[7] and C6 as inputs and outputs C7 and S7; another receives A[8]B[8] and C7 as inputs and outputs C8 and S8; yet another receives A[9]B[9] and C8 as inputs and outputs C9 and S9; and the last receives A[10]B[10] and C9 as inputs and outputs S10 (but not C10, which has already been pre-computed by the second section 792 of the primary carry bit generation circuit 720).

The second RCA 735e includes four full adders 731 in series: one receives A[11]B[11] and C10 as inputs and outputs C11 and S11, another receives A[12]B[12] and C11 as inputs and outputs C12 and S12, yet another receives A[13]B[13] and C12 as inputs and outputs C13 and S13, and the last receives A[14]B[14] and C13 as inputs and outputs S14 (but not C14, which has already been pre-computed by the second section 792 of the primary carry bit generation circuit 720). The second RCA 735f also includes four full adders 731 in series: one receives A[15]B[15] and C14 as inputs and outputs C15 and S15, another receives A[16]B[16] and C15 as inputs and outputs C16 and S16, yet another receives A[17]B[17] and C16 as inputs and outputs C17 and S17, and the last receives A[18]B[18] and C17 as inputs and outputs S18 (but not C18, which has already been pre-computed by the third section 793 of the primary carry bit generation circuit 720).

The third RCA 735g includes two full adders 731 in series: one receives A[19]B[19] and C18 as inputs and outputs C19 and S19 and the other receives A[20]B[20] and C19 as inputs and outputs S20 (but not C20, which has already been pre-computed by the third section 793 of the primary carry bit generation circuit 720). The third RCA 735h includes two full adders 731 in series: one receives A[21]B[21] and C20 as inputs and outputs C21 and S21 and the other receives A[22]B[22] and C21 as inputs and outputs S22 (but not C22, which has already been pre-computed by the third section 793 of the primary carry bit generation circuit 720). The third RCA 735i only includes a single adder 731, which receives A[23]B[23] and C22 as inputs and outputs C23 (Cout) and S23. Again, it should be understood that the exemplary embodiment shown in FIGS. 7A-7B is not intended to be limiting and that for adders where the maximum operand size is a different odd number, the sum circuit could include a different number of third RCAs.

It should be noted that the last full adders in each of the RCAs within the sum circuit 630 of FIGS. 6A-6B and 730 of FIGS. 7A-7B are designated as 631', 731', respectively. As mentioned above, these last adders 61', 731' do not generate a secondary carry bit because that carry bit has been pre-computed in the primary carry bit generation circuit 620, 720.

Figure 8:
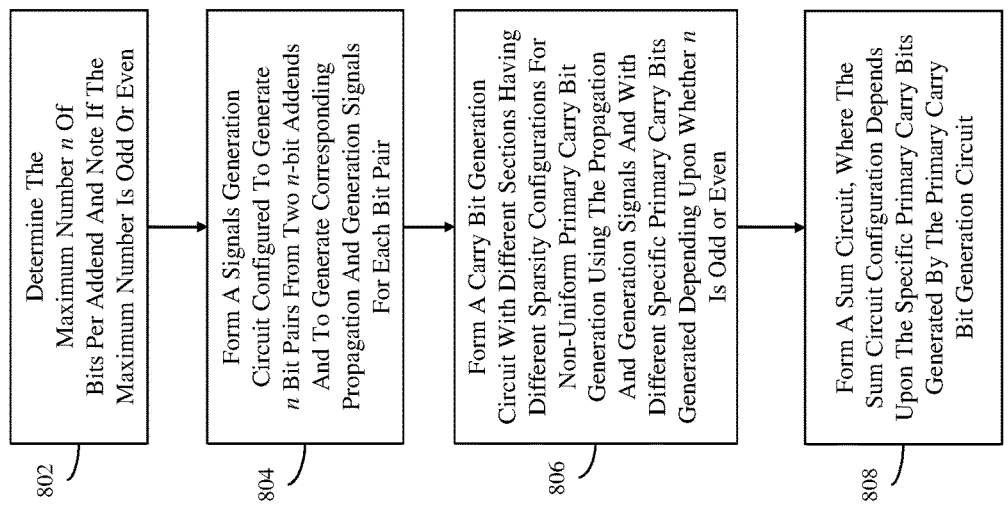
FIG. 8 is a flow diagram illustrating embodiments of a method of forming a parallel prefix adder.

Referring to the flow diagram of FIG. 8, also disclosed herein are embodiments of a method of forming a parallel prefix adder structure to compute a sum of two addends A and B (e.g., to form the adder 600 of FIGS. 6A-6B or the adder 700 of FIGS. 7A-7B).

To form the adder 600, 700, the method can include determining what the maximum number of bits per addend will be and also noting whether that maximum number is an odd number or an even number (see process step 802). Specifically, the addends A and B can be multi-bit binary words (i.e., n-bit binary words, where n is the maximum number of bits per addend or maximum operand size of the adder). This maximum number n of bits can be, for example, some number greater than sixteen and, optionally, no greater than 32. Thus, addend A can be expressed as A[n−1, . . . , 2, 1, 0] and added B can be expressed as B[n−1, . . . , 2, 1, 0], where 0 refers to the first bit (also referred to as the least significant bit (LSB)) in the binary word and n−1 refers to last bit (also referred to as the most significant bit (MSB)) in the binary word.

To form the adder 600, 700, the method can further include forming a signals generation circuit 610, 710 that is configured to receive the two addends A and B and to generate corresponding propagation and generation signals for all bit pairs of same position bits in the two addends (see process step 804). For example, the signals generation circuit can be formed so that, for addends A and B each having n-bits from the least significant bit (LSB) [0] to the most significant bit (MSB) [n−1], corresponding propagation and generation signals can be generated for bit pairs: A[0]B[0]; A[1]B[1]; . . . ; and A[n−1],B[n−1]. The signals generation circuit can also be formed so as to include n sets of XOR and AND logic gates, which will receive a given bit pair and can output P and G, respectively (i.e., P=A XOR B and G=A AND B) for that given bit pair such that the corresponding P and G signals for all of the bit pairs are output in parallel.

To form the adder 600, 700, the method can further include forming a primary carry bit generation circuit 620, 720 (also referred to herein as a carry bit generation tree or adder tree) (see process step 806). The primary carry bit generation circuit 620, 720 can be formed so that it is configured to receive the corresponding P and G signals 611, 711 for all the bit pairs, in parallel, and to generate primary carry bits (C) for some, but not all, of those bit pairs in parallel, as discussed in greater detail below. As mentioned above, the legend of FIG. 3 applies to this primary carry bit generation circuit 620, 720 and identifies the specific logic gates employed.

In any case, the primary carry bit generation circuit 620, 720 can be formed such that it includes multiple sections 691-693, 791-793. The multiple sections can include a first section 691, 791, which uses the corresponding P and G signals for each bit pair in a first sequential set of bit pairs to generate first primary carry bits at a first carry bit-to-bit pair ratio. The multiple sections can include second section 692, 792, which uses the corresponding P and G signals for each bit pair in a second sequential set of bit pairs to generate second primary carry bits at a second carry bit-to-bit pair ratio that is less than the first carry bit-to-bit pair ratio. The multiple sections can further include a third section 693, 793, which uses the corresponding P and G signals for each bit pair in a third sequential set of bit pairs to generate third primary carry bits at a third carry bit-to-bit pair ratio that is equal to the first carry bit-to-bit pair ratio.

It should be understood the sequential sets of bit pairs, mentioned above, are different non-overlapping subsets of all of the bit pairs in sequence with the first sequential set including, but not limited to, the bit pair corresponding to the LSB position (i.e., A[0]B[0]), the third sequential set including, but not limited to, the bit pair corresponding to the MSB position (i.e., A[n−1]B[n−1]) and the second sequential set including all bit pairs between those in the first first sequential set and those in the third sequential set. Furthermore, it should be understood that the carry bit-to-bit pair ratio of a given section is indicative of the sparsity configuration for that section only. For example, a carry bit-to-bit pair ratio of 1:1 for a given section would indicate that a primary carry bit would be generated for every bit pair within that section (i.e., a sparsity-1 configuration or non-sparse configuration); a carry bit-to-bit pair ratio of 1:2 for a given section would indicate that a primary carry bit will be generated for 1 out of every two bit pairs within that section (i.e., a sparsity-2 configuration); a carry bit-to-bit pair ratio of 1:4 for a given section would indicate that a primary carry bit will be generated for 1 out of every four bit pairs within that section (i.e., a sparsity-4 configuration); and so on.

Thus, for example, to form the exemplary adders 600 and 700 of FIGS. 6A-6B and 7A-7B, the primary carry bit generation circuit 620, 720 can be formed at process 806 such that: the first sequential set of bit pairs in the first section 691, 791 includes the first eight bit pairs (i.e., the first bit pair A[0]B[0] corresponding to the LSBs of the two addends A and B, the second bit pair A[1]B[1], the third bit pair A[2]B[2], the fourth bit pair A[3]B[3], the fifth bit pair A[4]B[4], the sixth bit pair A[5]B[5], the seventh bit pair A[6]B[6] and the eighth bit pair A[7]B[7]); the second sequential set of bit pairs in the second section 692, 792 includes the next eight bit pairs (i.e., the ninth bit pair A[8]B[8], the tenth bit pair A[9]B[9], the eleventh bit pair A[10]B[10], the twelfth bit pair A[11]B[11], the thirteenth bit pair A[12]B[12], the fourteenth bit pair A[13]B[13], the fifteenth bit pair A[14]B[14] and the sixteenth bit pair A[15]B[15]); and the third sequential set of bit pairs in the third section 693, 793 includes the seventeenth bit pair A[15]B[15] up to a last bit pair A[n−1]B[n−1] corresponding to the MSB position of the two addends A and B (e.g., A[22]B[22] in the adder 600 of FIGS. 6A-6B and A[23]B[23] in the adder 700 of FIGS. 7A-7B). Furthermore, the primary carry bit generation circuit 620, 720 can be formed such that the first section 691, 791 is configured with a first carry bit-to-bit pair ratio of 1:2 (i.e., it has a sparsity-2 configuration); the second section 692, 792 is configured with a second carry bit-to-bit pair ratio of 1:4 (i.e., it has sparsity-4 configuration); and the third section 693, 793 is configured with a third carry bit-to-bit pair ratio of 1:2 (i.e., like the first section, the third section has a sparsity-2 configuration).

For optimal performance, the specific bit pairs for which the primary carry bits are generated in the different sections 691-693, 791-793 can vary depending upon whether the maximum operand size of the adder (i.e., the maximum number n of bits in the addends) is an odd number of bits or an even number. Thus, the method can include determining which specific primary carry bits to generate based on whether the maximum operand size of the adder and at process 806 forming the primary carry bit generation circuit 620, 720 accordingly.

For example, for an adder 600, which will be configured to compute the sum of two addends A and B having an odd maximum number of bits (e.g., 23 bits, 25 bits, 27 bits, etc.), the primary carry bit generation circuit 620 can be formed at process 806 with a first section 691 that processes bit pairs A[0]B[0]-A[7]B[7] using a sparsity-2, a second section 692 that processes bit pairs A[8]B[8]-A[15]B[15] using a sparsity-4 configuration, and a third section 693 that processes bit pairs A[16]B[16]-A[n−1]B[n−1] and the branches in this circuit 620 can be arranged such that the first primary carry bits that are generated by the first section 691 are carry bits C1 for the second bit pair A[1]B[1], C3 for the fourth bit pair A[3]B[3], and C5 for the sixth bit pair A[5]B[5], such that the second primary carry bits that are generated by the second section 692 are carry bits C9 for the tenth bit pair A[9]B[9] and C13 for the fourteenth bit pair A[13]B[13], and such that the third primary carry bits that are generated by the third section 693 are carry bits C17 for the eighteenth bit pair A[17]B[17], C19 for the twentieth bit pair A[21]B

[21], C21 for the twenty-second bit pair A[21]B[21] and so on (depending on the total of the odd maximum number of bits), as shown in FIGS. 6A-6B.

Alternatively, for an adder 700, which will be configured to compute the sum of two addends A and B having an even maximum number of bits (e.g., 22 bits, 24 bits, 26 bits, etc.), the primary carry bit generation circuit 720 will be formed at process 806 with a first section 791 that processes bit pairs A[0]B[0]-A[7]B[7] using a sparsity-2, a second section 792 that processes bit pairs A[8]B[8]-A[15]B[15] using a sparsity-4 configuration, and a third section 793 that processes bit pairs A[16]B[16]-A[n−1]B[n−1] and the branches in this circuit 720 will be arranged such that the first primary carry bits that are generated by the first section 791 are carry bits C2 for the third bit pair A[2]B[2], C4 for the fifth bit pair A[4]B[4], and C6 for the seventh bit pair A[6]B[6], such that the second primary carry bits that are generated by the second section 792 are carry bits C10 for the eleventh bit pair A[11]B[11] and C14 for the fifteenth bit pair A[16]B[16], and such that the third primary carry bits that are generated by the third section 793 are carry bits C18 for the nineteenth bit pair A[18]B[18], C20 for the twenty-first bit pair A[20]B[20], C22 for the twenty-third bit pair A[22]B[22] and so on (depending on the total maximum even number of bits), as shown in FIGS. 7A-7B.

To form the adder, the method can further include forming a sum circuit 630, 730 (see process step 808). This sum circuit 630, 730 can be formed at process 808 such that it is configured to receive the addends A and B (i.e., inputs 601, 701) and to also receive the primary carry bits (e.g., primary carry bits C1, C3, C5, C9, C13, C17, C19 and C21 in the case of the adder 600 of FIGS. 6A-6B and primary carry bits C2, C4, C6, C10, C14, C18, C20 and C22 in the case of the adder 700 of FIGS. 7A-7B) from the primary carry bit generation circuit 620, 720. The sum circuit 630, 730 can further be formed at process 808 such that it is configured to form the same n bit pairs from the two addends A and B, as discussed above with regard to the signal's generation circuit 610, 710. The sum circuit 630, 730 can further be formed at process 808 with multiple ripple carry adders (RCAs) that are configured, as described in detail above with regard to the structure embodiments, to use the bit pairs and the primary carry bits during the generation of secondary carry bits, as necessary, and also the generation of sum bits S0, S1, S2, . . . Sn−1 for each bit pair A[0]B[0], A[1]B[1], A[2]B[2], . . . A[n−1]B[n−2], respectively, in order to compute and output the final sum 639, 739 (Sout). Those skilled in the art will recognize that computation of a sum bit for a particular bit pair requires the carry bit from the immediately preceding bit pair. The "primary carry bits" simply refer to those carry bits that have been pre-computed, by the primary carry bit generation circuit, for some of the bit pairs, whereas "secondary carry bits" refer to all remaining carry bits that have not pre-computed and, thus, will be generated within the sum circuit itself. Additionally, as discussed in greater detail above with regard to the structure embodiments, the configuration for the multiple RCAs within the sum circuit 630, 730 will vary depending upon which primary carry bits are generated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are embodiments of a parallel prefix adder structure that balances the design goals of reducing delay, reducing area consumption, reducing power consumption, and reducing routing congestion and a method of forming the structure. Specifically, the parallel prefix adder structure incorporates a carry bit generation circuit (also referred to herein as a carry bit generation tree or adder tree), which is configured to generate primary carry bits for at least some bit pairs and a sum circuit, which includes multiple relatively small ripple carry adders (RCAs) that use these primary carry bits to generate secondary carry bits as well as sum bits for computation of a final sum. However, unlike carry bit generation circuits in prior art adders where the primary carry bits are uniformly generated (e.g., at every second bit pair in the case of a sparsity-2 configuration or at every fourth bit pair in the case of a sparsity-4 configuration), the disclosed carry bit generation circuit has different sections, which process different sequential sets of bit pairs and which have different sparsity configurations such that generation of the primary carry bits is non-uniform. That is, in the different sections the primary carry bits are generated at different carry bit-to-bit pair ratios (e.g., the different carry bit-to-bit pair ratios for the different sections can be 1:2, 1:4, and 1:2, respectively). For optimal performance, the specific bit pairs for which these primary carry bits are generated will vary depending upon whether the maximum operand size of the adder is an odd number of bits or an even number. Such a parallel prefix adder can be used to achieve a significant decrease in area and power consumption (e.g., by up to 25% or more) and a significant decrease in dynamic power consumption (e.g., by up to 25% or more) with only a minimal increase in delay (e.g., by less than 5%) as compared to conventional Kogge-Stone Adder (KSA).

What is claimed is:

1. An adder comprising:
    a primary carry bit generation circuit configured to receive corresponding propagation and generation signals for all bit pairs of same position bits of two addends and to generate primary carry bits, wherein the primary carry bit generation circuit comprises:
    a first section that uses the corresponding propagation and generation signals for each bit pair in a first sequential set of bit pairs to generate first primary carry bits at a first carry bit-to-bit pair ratio;
    a second section using the corresponding propagation and generation signals for each bit pair in a second sequential set of bit pairs to generate second primary carry bits at a second carry bit-to-bit pair ratio that is less than the first carry bit-to-bit pair ratio; and
    a third section using the corresponding propagation and generation signals for each bit pair in a third sequential set of bit pairs to generate third primary carry bits at a third carry bit-to-bit pair ratio that is equal to the first carry bit-to-bit pair ratio.

2. The adder of claim 1, wherein the first carry bit-to-bit pair ratio and the second carry bit-to-bit pair ratio are each 1:2 and wherein the second carry bit-to-bit pair ratio is 1:4.

3. The adder of claim 1,
    wherein the two addends each have a same maximum number of bits between seventeen and thirty-two,
    wherein the first sequential set of bit pairs comprises a first bit pair corresponding to a least significant bit position of the two addends, a second bit pair, a third bit pair, a fourth bit pair, a fifth bit pair, a sixth bit pair, a seventh bit pair and an eighth bit pair, wherein the second sequential set of bit pairs comprises a ninth bit pair, a tenth bit pair, an eleventh bit pair, a twelfth bit pair, a thirteenth bit pair, a fourteenth bit pair, a fifteenth bit pair and a sixteenth bit pair, and wherein the third sequential set of bit pairs comprises a seventeenth bit pair up to a last bit pair corresponding to a most significant bit position of the two addends.

4. The adder of claim 3, wherein the maximum number is an odd number, wherein the first section generates the first primary carry bits for the second bit pair, the fourth bit pair, and the sixth bit pair, and wherein the second section generates the second primary carry bits for the tenth bit pair and the fourteenth bit pair.

5. The adder of claim 3, wherein the maximum number is an even number, wherein the first section generates the first primary carry bits for the third bit pair, the fifth bit pair, and the seventh bit pair, and wherein the second section generates the second primary carry bits for the eleventh bit pair and the fifteenth bit pair.

6. The adder of claim 1, further comprising a sum circuit configured to receive the primary carry bits, wherein the sum circuit comprises multiple ripple carry adders configured to use the primary carry bits during generation of secondary carry bits and sum bits for computation of a final sum.

7. The adder of claim 6, wherein at least some of the multiple ripple carry adders have different lengths.

8. An adder comprising:

a signals generation circuit configured to receive two addends and to generate, for all bit pair of same position bits in the two addends, corresponding propagation and generation signals; and a primary carry bit generation circuit configured to receive the corresponding propagation and generation signals and to generate primary carry bits, wherein the primary carry bit generation circuit comprises:

a first section using the corresponding propagation and generation signals for each bit pair in a first sequential set of bit pairs to generate first primary carry bits at a first carry bit-to-bit pair ratio of 1:2;

a second section using the corresponding propagation and generation signals for each bit pair in a second sequential set of bit pairs to generate second primary carry bits at a second carry bit-to-bit pair ratio of 1:4; and a third section using the corresponding propagation and generation signals for each bit pair in a third sequential set of bit pairs to generate third primary carry bits at a third carry bit-to-bit pair ratio of 1:2.

9. The adder of claim 8, further comprising: a sum circuit configured to receive the primary carry bits, wherein the sum circuit comprises multiple ripple carry adders configured to use the primary carry bits during generation of secondary carry bits and sum bits for computation of a final sum.

10. The adder of claim 9, wherein the two addends each have a same maximum number of bits between seventeen and thirty-two, wherein the first sequential set of bit pairs comprises a first bit pair corresponding to a least significant bit position of the two addends, a second bit pair, a third bit pair, a fourth bit pair, a fifth bit pair, a sixth bit pair, a seventh bit pair and an eighth bit pair, wherein the second sequential set of bit pairs comprises a ninth bit pair, a tenth bit pair, an eleventh bit pair, a twelfth bit pair, a thirteenth bit pair, a fourteenth bit pair, a fifteenth bit pair and a sixteenth bit pair, and wherein the third sequential set of bit pairs comprises a seventeenth bit pair up to a last bit pair corresponding to a most significant bit position of the two addends.

11. The adder of claim 10, wherein the maximum number is an odd number, wherein the first section generates the first primary carry bits for the second bit pair, the fourth bit pair, and the sixth bit pair, wherein the second section generates the second primary carry bits for the tenth bit pair and the fourteenth bit pair, wherein multiple ripple carry adders comprise first ripple carry adders that generate sum bits for the first bit pair through the tenth bit pair and further generate secondary carry bits for the first bit pair, the third bit pair, the fifth bit pair and the seventh bit pair through the ninth bit pair, and wherein the multiple ripple carry adders comprise second ripple carry adders that generate sum bits for the eleventh bit pair through an eighteenth bit pair and further generate secondary carry bits for the eleventh bit pair through the thirteenth bit pair and for the fifteenth bit pair through the seventeenth bit pair.

12. The adder of claim 11, wherein the first ripple carry adders include three first ripple carry adders, each comprising two full adders in series, and one first ripple carry adder with four full adders in series, and wherein the second ripple carry adders include two second ripple carry adders each with four full adders in series.

13. The adder of claim 10, wherein the maximum number is an even number, wherein the first section generates the first primary carry bits for the third bit pair, the fifth bit pair, and the seventh bit pair, wherein the second section generates the second primary carry bits for the eleventh bit pair and the fifteenth bit pair, wherein the multiple ripple carry adders comprise first ripple carry adders that generate sum bits for the first bit pair through the eleventh bit pair and further generate secondary carry bits for the first bit pair, the second bit pair, the fourth bit pair, the sixth bit pair and the eighth bit pair through the tenth bit pair, and wherein the multiple ripple carry adders further comprise second ripple carry adders that generate sum bits for the twelfth bit pair through a nineteenth bit pair and further generate the secondary carry bits for the twelfth bit pair through the fourteenth bit pair and for the sixteenth bit pair through the eighteenth bit pair.

14. The adder of claim 13, wherein the first ripple carry adders include one first ripple carry adder with three full adders in series, two first ripple carry adders each with two full adders in series, and one first ripple carry adder with four full adders in series, and wherein the second ripple carry adders include two second ripple carry adders each with four full adders in series.

15. A method of forming an adder to compute a sum of two addends, the method comprising:
- determining a maximum number of bits per addend;
- noting whether the maximum number is an odd number or an even number; and
- forming a primary carry bit generation circuit configured to receive corresponding propagation and generation signals for all bit pairs of same position bits in the two addends and to generate primary carry bits associated with some of the bit pairs,
- wherein the primary carry bits are associated with different bit pairs depending upon whether the maximum number is an odd number or an even number, and
- wherein the forming of the primary carry bit generation circuit comprises:
  - forming a first section that uses the corresponding propagation and generation signals for each bit pair in a first sequential set of bit pairs to generate first primary carry bits at a first carry bit-to-bit pair ratio;
  - forming a second section that uses the corresponding propagation and generation signals for each bit pair in a second sequential set of bit pairs to generate second primary carry bits at a second carry bit-to-bit pair ratio that is less than the first carry bit-to-bit pair ratio; and
  - forming a third section that uses the corresponding propagation and generation signals for each bit pair in a third sequential set of bit pairs to generate third primary carry bits at a third carry bit-to-bit pair ratio that is equal to the first carry bit-to-bit pair ratio.

16. The method of claim 15, wherein the forming of the primary carry bit generation circuit is performed such that the first carry bit-to-bit pair ratio and the second carry bit-to-bit pair ratio are each 1:2 and such that the second carry bit-to-bit pair ratio is 1:4.

17. The method of claim 15,
- wherein the maximum number is between seventeen and thirty-two,
- wherein the first sequential set of bit pairs comprises a first bit pair corresponding to a least significant bit position of the two addends, a second bit pair, a third bit pair, a fourth bit pair, a fifth bit pair, a sixth bit pair, a seventh bit pair and an eighth bit pair,
- wherein the second sequential set of bit pairs comprises a ninth bit pair, a tenth bit pair, an eleventh bit pair, a twelfth bit pair, a thirteenth bit pair, a fourteenth bit pair, a fifteenth bit pair and a sixteenth bit pair, and
- wherein the third sequential set of bit pairs comprises a seventeenth bit pair up to a last bit pair corresponding to a most significant bit position of the two addends.

18. The method of claim 17,
- wherein the maximum number is an odd number,
- wherein the first section generates the first primary carry bits for the second bit pair, the fourth bit pair, and the sixth bit pair, and
- wherein the second section generates the second primary carry bits for the tenth bit pair and the fourteenth bit pair.

19. The method of claim 17,
- wherein the maximum number is an even number,
- wherein the first section generates the first primary carry bits for the third bit pair, the fifth bit pair, and the seventh bit pair, and
- wherein the second section generates the second primary carry bits for the eleventh bit pair and the fifteenth bit pair.

20. The method of claim 15, further comprising:
- forming a signals generation circuit configured to receive the two addends and to generate the corresponding propagation and generation signals; and
- forming a sum circuit configured to receive primary carry bits and comprising multiple ripple carry adders are configured to use the primary carry bits during generation of secondary carry bits and sum bits form computation of a final sum, wherein at least some of the multiple ripple carry adders have different lengths.

* * * * *